United States Patent [19]
Luciani et al.

[11] Patent Number: 5,320,995
[45] Date of Patent: Jun. 14, 1994

[54] CATALYSTS FOR THE POLYMERIZATION OF OLEFINS

[75] Inventors: Luciano Luciani, Ferrara; Mario Polesello, Oderzo; Federico Milani, Santa Maria Maddalena; Renzo Invernizzi, Milan; Giovanni Soverini, Ferrara, all of Italy

[73] Assignee: ECP Enichem Polimeri S.r.l., Milan, Italy

[21] Appl. No.: 957,512

[22] Filed: Oct. 5, 1992

[30] Foreign Application Priority Data

Oct. 9, 1991 [IT] Italy ............... MI91 A/002682

[51] Int. Cl.$^5$ ............................... C08F 4/655
[52] U.S. Cl. ................... 502/107; 502/104; 502/117; 502/121; 502/123; 502/125; 502/126; 502/127; 502/115; 502/116; 502/132; 502/134
[58] Field of Search ............. 502/107, 104, 117, 132, 502/121, 123, 125, 126, 127, 115, 116, 134

[56] References Cited

U.S. PATENT DOCUMENTS

| | | | |
|---|---|---|---|
| 4,120,820 | 10/1978 | Birkelbach | 502/115 |
| 4,163,831 | 8/1979 | Gessell | 502/132 X |
| 4,250,286 | 2/1981 | Shipley | 502/115 X |
| 4,379,760 | 4/1983 | Shipley et al. | 502/115 |
| 4,409,126 | 10/1983 | Shipley et al. | 502/115 |
| 4,412,939 | 11/1983 | Shipley et al. | 502/132 X |

FOREIGN PATENT DOCUMENTS 0029623 6/1981 European Pat. Off. .
0093494 11/1983 European Pat. Off. .
2018789 10/1979 United Kingdom .

OTHER PUBLICATIONS

Chemical Abstracts No. 62505a, vol. 77 (Sep. 1972).
Chemical Abstracts No. 59870a, vol. 83 (Aug. 25, 1975).
Chemical Abstracts No. 140706k, vol. 86 (May 16, 1977).
Chemical Abstracts No. 68839g, vol. 87 (Sep. 5, 1977).
Chemical Abstracts No. 59450z, vol. 92 (Feb. 11, 1980).

*Primary Examiner*—Patrick P. Garvin
*Attorney, Agent, or Firm*—Shea & Gould

[57] ABSTRACT

A catalyst for the polymerization of olefins, containing magnesium, chlorine, aluminium and at least one transition metal, in a dispersed or emulsified form within an inert diluent, is obtained by:
  contacting, in an inert diluent, a magnesium dialkyl and aluminium trichloride, in a molar ratio equal or almost equal to 2/1, at a temperature lower than 105° C. to obtain a catalyst precursor in a suspended form, or at a temperature higher than 105° C. to form a catalyst precursor in the form of a colloidal emulsion, in the diluent used; and
  contacting said suspended or emulsified precursor with at least one compound of a transition metal to form a catalyst in the form of a suspension or emulsion respectively.

15 Claims, No Drawings

CATALYSTS FOR THE POLYMERIZATION OF OLEFINS

The present invention relates to catalysts for the polymerization of olefins in the form of a suspension or emulsion, the procedure for their production and their use in the polymerization of olefins.

Ziegler-Natta type catalysts are already known in the art, which are active in the polymerization of α-olefins, generally formed by the combination of an organometallic compound of the elements belonging to groups I to III and a compound of a transition metal belonging to groups IV to VI of the Periodic Table (Boor Jr., "Ziegler-Natta Catalysts and Polymerization", Academic, New York, 1979). Generally an aluminium alkyl is used as the organometallic compound and a titanium halide as the transition metal. The possibility of binding or depositing the titanium halide on a solid and granular support is also known (Karol F. J., Catal. Rev. - Sci. Eng., 26, 384, 557–595, 1984).

Particularly, it is known the activation of magnesium chloride and its use in the preparation of catalysts based on titanium salts, which are highly active in the polymerization of olefins, as described for example in Germany 2.153.520 (CA 77, 62505, 1972); Germany 2.638.429 (CA 83, 59870, 1972); Germany 2.638.429 (CA 86, 140706, 1975); Belgium 848.427 (CA 87, 68839, 1977); and Japan 79.118.484 (CA 92, 59450, 1979).

Finally the preparation of catalytic components is known by the treatment of solid products deriving from anhydrous magnesium chloride, an electron-donor and titanium compounds (IV), with halides of boron, aluminium, gallium, indium, tallium, tin or antimony in their state of higher oxidation, as described for example in European Patent Application publication No. 29.623.

In accordance with the present invention it has been found that it is possible to react a magnesium dialkyl and aluminium trichloride, in a molar ratio of about 2/1, operating in an inert solvent, to give a catalyst precursor in the form of a suspension or emulsion, depending on the reaction temperature. It has also been found that said suspension or emulsion is capable of reacting with one or more compounds of transition metals to give catalysts which are highly active in the polymerization of olefins.

In accordance with this, the first aspect of the present invention relates to a procedure for the preparation of a catalyst for the polymerization of olefins containing magnesium, chlorine, aluminium and at least one transition metal, said catalyst being in a dispersed or emulsion form in an inert diluent, which includes:

(i) contact, in an inert diluent, of a magnesium dialkyl and aluminium trichloride, in a molar ratio equal or almost equal to 2/1, at a temperature lower than 105° C. to obtain a catalyst precursor in a suspended form, or at a temperature higher than 105° C. to form a catalyst precursor in a colloidal emulsion form, in the diluent used; and (ii) contact of said suspended or emulsioned precursor with at least one compound of a transition metal to form a catalyst in the form of a suspension or emulsion respectively.

The magnesium dialkyls which can be used in step (i) of the procedure are compounds which can be defined with the formula MgR'R", where R' and R", the same or different, each independently represents an alkyl group, linear or branched, containing 1 to 10 carbon atoms. Specific examples of magnesium dialkyl are: magnesium diethyl, magnesium ethyl butyl, magnesium dihexyl, magnesium butyl octyl, and magnesium dioctyl. The corresponding halides, for example chlorides, of magnesium alkyl may also be used.

Suitable diluents for the purpose are organic diluents, liquid under the operating conditions, and inert towards the reagents magnesium dialkyl and aluminium chloride and may be conveniently selected from aliphatic hydrocarbons and silicon oils.

In particular it has been found that by the contact of magnesium dialkyl and aluminium trichloride, in an inert diluent of medium to low viscosity, at a temperature equal to or lower than about 105° C., and generally between 70° and 100° C., and for a period of about 0.5 to about 3 hours, in step (i) of the procedure, a dispersion is obtained containing magnesium chloride which is solid and crystalline with regular particles, having a diameter ranging from several microns to 1 mm, depending on the concentration of the reagents, the geometrical form of the reactor, the viscosity of the dispersing medium and, more generally, on the fluodynamics of the system.

When the contact between magnesium dialkyl and aluminium trichloride is carried out at a temperature higher than 105° C., and generally from 110° to 150° C., and for a period of about 0.5 to about 3 hours, a complete and irreversible change in the physical state of the mixture is obtained which from an increasingly dispersed suspension reaches the limit of a state of emulsion of extremely fine drops with microscopic dimensions in the diluent used. The stability of this emulsion does not depend at all on the stirring of the system, the temperature at which is kept (at least until −20° C.) and how long it is kept before use.

According to the present invention the dispersion or emulsion thus obtained are used as precursors for the preparation of catalysts which are active in the polymerization of olefins. For this purpose, in step (ii) of the procedure, the dispersion or emulsion is put in contact and reacted with at least one compound of a transition metal, normally selected from halides, especially chlorides, alkoxides, especially $C_2$–$C_4$ alkoxides, and halogenalkoxides, especially the chloroalkoxides of titanium, zirconium, hafnium and vanadium. Examples of preferred compounds for the purpose are titanium tetrachloride, zirconium tetrachloride, hafnium tetrachloride and vanadium oxychloride.

The reaction between the dispersion or emulsion and the compound of a transition metal is normally carried out with an atomic ratio between magnesium and transition metal generally ranging from 30:1 to 0.5:1 and preferably in the range of 20:1–25:1. In addition the reaction is carried out at a temperature ranging from 50° to 120° C., and preferably in the range of 60°–90° C., and for a period of 0.5 to 4 hours, and preferably for 1–2 hours, to obtain a catalyst in a disperse or emulsion form, depending on the kind of precursor used. The catalysts thus obtained generally contain magnesium, transition metal, aluminium and chlorine in atomic proportions of 4–25:1:10–50:40–150.

In the case of a dispersed catalyst, the solid can be separated from the diluent at the end of step (ii). However in the preferred method the catalytic dispersions and emulsions are used directly in the polymerization procedure where they have advantages deriving from their physical form which enables them to be fed with liquid pumps, consequently simplifying plant equipment.

When a catalyst is required which is active in the stereospecific polymerization of alpha-olefins, step (ii) of the procedure is carried out in the presence of a Lewis base (or internal electron donor). This Lewis base may be selected from ethers, amines, esters, alcoholates, silanic compounds, ketones and phosphoramides.

The catalysts of the present invention are used in procedures for the (co)polymerization of alpha-olefins combined with a co-catalyst normally selected from aluminium trialkyls and halides (especially chlorides) of aluminium alkyl, containing from 1 to 6 carbon atoms in the alkyl portion. Among these, aluminium trialkyls, such as aluminium triethyl, aluminium tributyl, aluminium triisobutyl and aluminium trihexyl are preferred. The atomic ratio between the aluminium (in the co-catalyst) and titanium (in the catalyst) generally ranges from 0.5:1 to 1.000:1 and preferably from 50:1 to 200:1. In the case of the stereospecific polymerization of alpha-olefins, the co-catalyst may be complexed with an electron donor compound, such as a silane alkoxy like dimethoxy diphenyl silane.

Depending on the particular composition, the catalysts of the present invention can be used in the production of polymers and copolymers of ethylene, propylene, butene-1, 4-methyl-1-pentene and hexene-1, in procedures carried out in suspension in an inert diluent, in solution, or in procedures carried out at a high temperature and pressure in tubular or vessel reactors.

The experimental examples which follow provide a better illustration of the present invention.

EXAMPLE 1

Preparation of the Catalyst Precursor 216 ml of a 20% by weight solution in n-heptane of magnesium butyl octyl, 200 ml of anhydrous n-heptane and 50 g of aluminium trichloride are charged, at room temperature, into a 1.000 ml stirred reactor.

The stirred suspension is gradually heated in about 1 hour to 90° C., and is left at this temperature for 1 hour. A morphological variation is observed in the suspension, with the appearance of a grey crystalline solid. The suspension is cooled to room temperature and the solid, after repeated washing with anhydrous n-heptane, has the following analysis: Mg=24.5% by weight; Cl=70.2% by weight.

This solid which is composed of magnesium chloride in the form of solid and regular microcrystals with an average diameter of 10 $\mu$m, is used in suspension in n-heptane for the preparation of the catalyst in the following examples.

EXAMPLE 2

Preparation of the Catalyst 100 ml of the suspension in n-heptane obtained in Example 1, containing 4.5 g of solid are placed in a 250 ml flask equipped with a mechanical stirrer. 50 g of titanium tetrachloride are added drop-wise to the flask at room temperature. The suspension is gradually heated to 90° C. in 0.5 hours and is kept at this temperature for the following 2 hours.

The solid obtained from this treatment is repeatedly washed with n-heptane at 90° C., until the titanium has completely disappeared from the washing liquid.

It is cooled to room temperature and a solid is obtained having the following analysis: Ti=1.3% by weight; Mg=22.7% by weight; Cl=68.4% by weight.

EXAMPLE 3

Preparation of the Catalyst 100 ml of the suspension in n-heptane obtained in Example 1, containing 4.5 g of solid, are placed in a 250 ml flask equipped with a mechanical stirrer. 0.8 g of titanium tetrachloride ar added to the flask dropwise at room temperature. The suspension is gradually heated to 60° C. in 0.5 hours and is kept at this temperature for a further 2 hours.

At this point the reflux cooler is replaced by a distillation column and the temperature is kept constant until the n-hexane has been completely eliminated, consequently obtaining a dried catalyst having the following analysis: Ti=2.9% by weight, Mg=15.4% by weight; Cl=51.5% by weight.

EXAMPLE 4

Polymerization Test

The following products are charged, in this order, into a stirred 5 liter reactor: 1.900 ml of anhydrous n-hexane, 0.5 g of aluminium triethyl as co-catalyst and 0.07 g of the catalyst prepared in Example 2. The atomic ratio between the aluminium in the co-catalyst and the titanium in the catalyst is thus equal to 200/1. The reactor is brought to a temperature of 85° C., is pressurized with hydrogen up to 5 atm and ethylene is then fed up to 9 atm (molar ratio hydrogen/ethylene equal to 1/1). The pressure is kept in the following two hours with the feeding of ethylene.

At the end of this period the polymerization is interrupted by charging 20 ml of a 10% by weight alcohol solution of ionol (2,6-di-t-butyl-p-cresol) into the reactor.

480 g of polyethylene are obtained with a productivity of 6.4 kg, expressed as kg of polyethylene per gram of catalyst and a yield of 491 kg, expressed as kg of polyethylene per gram of titanium in the catalyst.

The polymer obtained has the following characteristics:

Melt Index (190° C.; 2.16 kg)=2.8 g/10' (ASTM D1238);
Melt Index (190° C.; 21.6 kg)=85.7 g/10' (ASTM D1238);
Melt Index$_{21.6}$/Melt Index$_{2.16}$=30.6;
Density at 23° C.=0.963 (ASTM D1505);
Average diameter=180 $\mu$m

EXAMPLE 5

Polymerization Test

The same procedure is used as described in Example 4, using 1.0 g of aluminium triethyl as co-catalyst and 0.21 g of the catalyst prepared in Example 3. The atomic ratio between the aluminium in the co-catalyst and the titanium in the catalyst is thus equal to 100/1.

1.224 g of polyethylene are obtained with a productivity of 5.8 k, expressed as kg of polyethylene per gram of catalyst and a yield of 416 kg, expressed as kg of polyethylene per gram of titanium in the catalyst.

The polymer obtained has the following characteristics:

Melt Index (190° C.; 2.16 kg)=2.2 g/10' (ASTM D1238);

Melt Index (190° C.; 21.6 kg)=69.6 g/10' (ASTM D1238);
Melt Index$_{21.6}$/Melt Index$_{2.16}$=31.6;
Density at 23° C.=0.961 (ASTM D1515)
Average diameter=310 μm.

EXAMPLE 6

Preparation of the Catalyst Precursor in Emulsion 108 ml of a 20% by weight solution in n-heptane of magnesium butyl octyl and 150 ml of ISOPAR L (commercial product, mixture of $C_{10}$–$C_{14}$ isoparaffins) are charged, at room temperature, into a stirred 500 ml reactor. The solution obtained is heated to 98° C. and the n-heptane is completely distilled.

After cooling to room temperature, 25 g of aluminium trichloride are added and the stirred suspension is gradually heated in about 1 hour to 125° C. At this point, under vigorous stirring, a variation in the physical state is observed, with the formation of a light-grey emulsion perfectly stable over a period of time.

EXAMPLE 7

Preparation of the Catalyst 300 ml of the emulsion prepared in Example 6, containing 0.085 moles of magnesium, are placed into a 500 ml flask, equipped With a mechanical stirrer. 1.0 ml of titanium tetrachloride are added to the flask at room temperature (atomic ratio Mg/Ti=10/1). The flask is gradually heated to 60° C. in 0.5 hours and is kept at this temperature for a further 2 hours.

At the end of this period the flask is cooled to room temperature and a violet emulsion is obtained containing, in atomic proportions:

Mg(8.8); Ti(1); Al(16.0); Cl(50.6)

EXAMPLE 8

Polymerization Test

The following products are charged, in this order, into a 5 liter stirred reactor: 1.900 ml of anhydrous n-hexane, 0.5 g of aluminium triethyl as co-catalyst and 1.5 ml of the emulsion obtained in Example 7, containing 0.04 mmoles of titanium. The atomic ratio between the aluminium in the co-catalyst and the titanium in the suspension is thus equal to 100/1. The reactor is brought to a temperature of 85° C., is pressurized with hydrogen up to 5 atm and ethylene is then fed up to 9 atm (molar ratio hydrogen/ethylene equal to 1/1). The pressure is maintained for a further two hours feeding ethylene.

135 g of polyethylene are obtained with a yield of 70.3 kg, expressed as kg of polyethylene per gram of titanium in the emulsion.

The polymer obtained has the following characteristics:

Melt Index (190° C.; 2.16 kg)=1.4 g/10' (ASTM D1238);
Melt Index (190° C.; 21.6 kg)=35.7 g/10' (ASTM D1238);
Melt Index$_{21.6}$/Melt Index$_{2.16}$=25.5;
Density at 23° C.=0.962 (ASTM D1505);
Average diameter=600 μm

EXAMPLE 9

A sample of the catalytic emulsion obtained in Example 7, is used in an ethylene/butene copolymerization test at high pressure in a vessel reactor, using aluminium triethyl as co-catalyst, with an atomic ratio Al:Ti of 10:1.

The test conditions are:
temperature: 150° C.;
total pressure: 1.200 bar;
residence time: 50 sec;
Molar ratio ethylene/butene-1: 1/1.

A yield of 156 is obtained expressed as kg of copolymer per gram of titanium and the copolymer obtained has the following characteristics:

Melt Index (190° C.; 2.16 kg)=3.0 g/10' (ASTM D1238);
Density at 23° C.=0.930 (ASTM D1505).

EXAMPLE 10

Preparation of the Catalyst 300 ml of an emulsion, prepared as described in Example 6 and containing 0.19 moles of magnesium, are placed in a 500 ml flask, equipped with a mechanical stirrer. 0.25 ml of titanium tetrachloride are added to the flask operating at room temperature (atomic ratio Mg/Ti=20/1). The flask is gradually heated to 60° C. in 0.5 hours and is kept at this temperature for 1 hour.

At the end of this period it is cooled to room temperature and a violet emulsion is obtained containing, in atomic proportions:

Mg(21.8); Ti(1); Al(44.8); Cl(134.2).

EXAMPLE 11

Preparation of the Catalyst 300 ml of an emulsion, prepared as described in Example 6 and containing 0.19 moles of magnesium, are placed into a 500 ml flask, equipped with a mechanical stirrer. 0.45 ml of titanium tetrachloride and 0.41 ml of vanadium oxychloride (VOCl$_3$) are added to the flask operating at room temperature (atomic ratio Ti/V=1/1 and Mg/(Ti+V)=5/1). The flask is gradually heated to 60° C. in 0.5 hours and is kept at this temperature for 1 hour.

At the end of this period it is cooled to room temperature and a dark-violet emulsion is obtained containing, in atomic proportions:

Mg(9.5); Ti(1); V(1); Al(27.8); Cl(83.0).

EXAMPLE 12

Polymerization Test

The following products are charged, in this order, into a 5 liter stirred reactor: 1.900 ml of anhydrous n-hexane, 0.25 g of aluminium triethyl as co-catalyst and 2.0 ml of the emulsion obtained in Example 10, containing 0.02 mmoles of titanium. The atomic ratio between the aluminium in the co-catalyst and the titanium in the suspension is thus equal to 100/1. The reactor is brought to a temperature of 85° C., is pressurized with hydrogen up to 5 atm and ethylene is then fed up to 9 atm (molar ratio hydrogen/ethylene equal to 1/1). The pressure is maintained for the following two hours feeding ethylene.

206 g of polyethylene are obtained with a yield of 226.4 kg, expressed as kg of polyethylene per gram of titanium in the emulsion.

The polymer obtained has the following characteristics:

Melt Index (190° C.; 2.16 kg)=1.96 g/10' (ASTM D1238);
Melt Index (190° C.; 21.6 kg)=65.9 g/10' (ASTM D1238);
Melt Index$_{21.6}$/Melt Index$_{2.16}$=33.6;
Density at 23° C.=0.963 (ASTM D1505).

EXAMPLE 13

Polymerization Test

The following products are charged, in this order, into a 5 liter stirred reactor: 1.900 ml of anhydrous n-hexane, 0.5 g of aluminium triethyl as co-catalyst and 1.2 ml of the emulsion obtained in Example 11, containing 0.04 mmoles of titanium. The atomic ratio between the aluminium in the co-catalyst and the titanium in the suspension is thus equal to 100/1. The reactor is brought to a temperature of 85° C., is pressurized with hydrogen up to 5 atm and ethylene is then fed up to 9 atm (molar ratio hydrogen/ethylene equal to 1/1). The pressure is maintained for the following two hours by feeding ethylene.

263 g of polyethylene are obtained with a yield of 130.8 kg, expressed as kg of polyethylene per gram of titanium in the emulsion.

The polymer obtained has the following characteristics:

Melt Index (190° C.; 2.16 kg)=0.64 g/10' (ASTM D1238);
Melt Index (190° C.; 21.6 kg)=22.8 g/10' (ASTM D1238);
Melt Index$_{21.6}$/ Melt Index$_{2.16}$=35.6;
Density at 23° C.=0.961 (ASTM D1505).

We claim:

1. Procedure for the preparation of a catalyst for the polymerization of olefins containing magnesium, chlorine, aluminium and at least one transition metal, said catalyst being in an emulsified form in an inert diluent, characterized in that it comprises:
   (i) contacting, in an inert diluent, a magnesium dialkyl and aluminum trichloride, in a molar ratio equal or almost equal to 2/1, at a temperature higher than 105° C. to form a catalyst precursor in the form of a colloidal emulsion in the diluent used; and
   (ii) contacting said emulsified precursor with at least one compound of a transition metal to form a catalyst in the form of an emulsion.

2. Procedure according to claim 1, characterized in that said magnesium alkyl is a compound having the formula MgR'R", where R' and R", the same or different, each independently represents an alkyl group, linear or branched, containing from 1 to 10 carbon atoms.

3. Procedure according to claim 1, characterized in that said inert diluent is selected from the group consisting of aliphatic hydrocarbons and silicon oils.

4. Procedure according to claim 1, characterized in that in step (i) a catalyst precursor is prepared in an emulsion form by operating at a temperature ranging from 110° to 150° C., and for a period of about 0.5 to about 3 hours.

5. Procedure according to claim 1, characterized in that in step (ii) at least one compound of a transition metal is added, selected from the group consisting of halides, alkoxides, and halogenalkoxides, of titanium, zirconium, hafnium and vanadium.

6. Procedure according to claim 5, characterized in that the compound of a transition metal is selected from the group consisting of titanium tetrachloride, zirconium tetrachloride, hafnium tetrachloride and vanadium oxychloride.

7. Procedure according to claim 1, characterized in that step (ii) is carried out with an atomic ratio between magnesium and the transition metal ranging from 30:1 to 0.5:1, at a temperature ranging from 50° to 120° C., and for a period of 0.5 to 4 hours.

8. Procedure according to claim 1, characterized in that step (ii) is carried out in the presence of a Lewis base selected from the group consisting of ethers, amines, esters, alcoholates, silane compounds, ketones and phosphoramides.

9. Procedure according to claim 1, characterized in that in the catalyst the magnesium, transition metal, aluminium and chlorine are present in the following atomic proportions 4–25:1:10–50:40–150.

10. A procedure according to claim 5, wherein the halide is chloride.

11. A procedure according to claim 5, wherein the alkoxide is a $C_2$-$C_4$ alkoxide.

12. A procedure according to claim 5, wherein the halogen alkoxide is a chloroalkoxide.

13. A procedure according to claim 7, wherein the atomic ratio between magnesium and the transition metal is within the range 20:1-25:1.

14. A procedure according to claim 7, wherein the temperature is from 60° to 90° C.

15. A procedure according to claim 7, wherein the time is from 1 to 2 hours.

* * * * *